United States Patent
Otterbein et al.

(10) Patent No.: US 6,250,533 B1
(45) Date of Patent: Jun. 26, 2001

(54) CLAMPING DEVICE FOR USE IN MOTOR VEHICLE PRODUCTION LINES AND PRODUCTION LINE HAVING SUCH A CLAMPING DEVICE

(75) Inventors: Wilhelm Otterbein, Bad Salzschlirf; Manfred Hahl, Poppenhausen, both of (DE)

(73) Assignee: EDAG Engineering & Design AG, Fuida (DE)

( * ) Notice: Subject to any disclaimer, the term of this patent is extended or adjusted under 35 U.S.C. 154(b) by 0 days.

(21) Appl. No.: 09/506,957

(22) Filed: Feb. 18, 2000

(30) Foreign Application Priority Data

Feb. 18, 1999 (DE) ................................. 199 07 015

(51) Int. Cl.$^7$ ........................... B23K 37/053; B23K 37/04
(52) U.S. Cl. ...................... 228/47.1; 228/44.3; 219/158
(58) Field of Search ............................... 228/41, 8, 44.3, 228/47.1, 49.1, 212; 219/659, 652, 158; 263/37, 40; 29/431

(56) References Cited

U.S. PATENT DOCUMENTS

| | | | |
|---|---|---|---|
| 4,442,335 | * | 4/1984 | Rossi . |
| 5,143,270 | * | 9/1992 | Hamada et al. . |
| 5,409,158 | * | 4/1995 | Angel . |
| 5,560,535 | * | 10/1996 | Miller et al. . |
| 6,008,471 | * | 12/1999 | Alborante . |

FOREIGN PATENT DOCUMENTS

| | | |
|---|---|---|
| 3606058 | 8/1986 | (DE) . |
| 3823947 | 1/1990 | (DE) . |
| 4313407 | 10/1994 | (DE) . |
| 19533389 | 3/1997 | (DE) . |
| WO 97/09226 | 3/1997 | (DE) . |
| 19818304 | 11/1998 | (DE) . |

* cited by examiner

Primary Examiner—Tom Dunn
Assistant Examiner—Jonathan Johnson
(74) Attorney, Agent, or Firm—Crowell & Moring, L.L.P.

(57) ABSTRACT

A clamping device for a motor vehicle production line has, on both sides of a transport apparatus for rough car bodies, ways on a common base frame leading underneath the transport apparatus for one side carriage each which can run separately on one side of the transport apparatus. The side carriage bears only the side members of one side of the transport apparatus. Clamping means serve to connect the side carriages with the base frame whenever the side carriages are in the working position.

9 Claims, 2 Drawing Sheets

CLAMPING DEVICE FOR USE IN MOTOR VEHICLE PRODUCTION LINES AND PRODUCTION LINE HAVING SUCH A CLAMPING DEVICE

BACKGROUND AND SUMMARY OF THE INVENTION

This invention relates to a clamping device which can be used in motor vehicle production lines and can travel in the direction of the production line. More particularly, this invention relates to a clamping device for rough car bodies traveling in the production line direction on a transport apparatus, which has side members on both sides of the production line, and crossbeams reaching over the rough car body and clamping elements for clamping the rough body, and in which the crossbeams are to be coupled together in the working position by a latch to form a single component clamping the rough car body. The invention furthermore relates to a production line having such a clamping device.

This application claims the priority of German application number 199 07 015.6, filed Feb. 18, 1999, the disclosure of which is expressly incorporated by reference herein.

A clamping device of this type is the subject of DE 195 33 389 A1. This publication also describes a production line with such a clamping device. In the known clamping device a base frame which can travel as a whole is provided, on which the side members are disposed. The transport apparatus for the rough bodies is disposed for travel on the base frame. Overall, the clamping device has two base frames disposed one behind the other with side members which bear variously configured clamps, so that one or the other clamping device can be used optionally in the production line for welding two different rough car bodies.

In the motor vehicle industry there is a growing desire to produce more than two different vehicle models one behind the other with minimum difficulty in changing over. However, this presents difficulties in the use of the clamping device disclosed by the said DE 195 33 389 A1, because an arrangement of more than two different clamping devices one behind the other usually is impossible for lack of space and would lead to undesirably great time losses in carrying the rough bodies from one clamping device to the other. Changing the clamping devices necessarily involves a long halt of the production line, because changing over is impossible without a simultaneous dismounting of the transport device around which the clamping device passes.

The invention is addressed to the problem of designing a clamping device of the kind referred to above such that a very quick adaptation to different models of rough car body will be possible. Furthermore, a production line with such a clamping device is to be created which will permit a very quick changeover between different rough car body types.

The first-mentioned problem is solved by the invention in that on both sides of the transport apparatus, ways are provided on a common base frame underneath the transport apparatus for each side carriage which can travel separately on one side of the transport apparatus, that the side carriage carries only the side members of one side of the transport apparatus, and that clamping means are provided for joining the side carriages with the base frame.

By this separation, according to the invention, of the side members and thus also of the clamps of the two sides of the production line, it is possible without disassembling the transport apparatus of the production line to remove from the production line the side carriages with the particular side members and clamps and replace them with side carriages with other hangers whenever the rough car body that is to be welded changes and therefore has to be clamped differently. Since the two ways of the side carriages are on a common base frame and the side carriages are to be joined by clamping means to the particular roller support and thus also to the base frame, then in the operation of the clamping device according to the invention, a continuous frame surrounding the rough car body is formed, precisely as in the known apparatus forming one unit, so that great rigidity and therefore great production accuracy results.

The ways can be configured variously. Components that have proven to be good for this purpose in production lines can be used if the ways are formed by roller holders with rollers journaled for rotation, on which the side carriage with a supporting frame rests.

The clamping means are intended to produce a frictional connection between the base frame and the side carriages. This can be achieved in an especially simple manner if, according to another embodiment of the invention, the clamping means are arranged on both sides of the roller support and are designed to grip the supporting frame within the roller holder.

To introduce a rough car body into the clamping device according to the invention, the latter can be moved with little effort to an open position in which the clamps are at a sufficient distance from the rough car body, if according to another embodiment of the invention the side members with the particular crossbeam are joined to the supporting frame for rotation outwardly away from the production line about an axis running horizontally parallel to the production line.

When the side carriages are exchanged, all of the clamps are simultaneously exchanged if, according to another embodiment of the invention, the side carriages have all of the clamps for the rough car body, including the bottom clamps.

The second problem mentioned, namely the creation of a production line with the clamping device described above, is solved by the invention in that on each side of the production line at least one station is provided for an additional side carriage of a pair of side carriages for an additional variant car body and if the production line has means for exchanging the side carriages. Such a production line permits the exchange of a complete clamping device by moving the two side carriages without the need to separate the transporting apparatus from the production line. Therefore such a changeover can be made very quickly, so that different models of the rough car bodies can be made quickly one after the other on a single production line.

With a production line according to the invention, by making use of the space available alongside the production line, a great number of different models of rough car bodies can be worked on without having the welding robots interfere with the exchanging of the side carriages, if before and behind a welding station of the production line several stations are provided side by side across the production line, each for one side carriage, and if for the exchange of side carriages on each side of the production line a transport path runs behind the welding station from the stations preceding the welding station to the stations following the welding station.

From each side of the production line welding robots can travel to a point directly in front of the rough car body without thereby blocking the path of the side carriages, if according to another embodiment of the invention one welding robot of one side of the production line is designed to enter into the path of the side carriages along the production line between the roller supports.

BRIEF DESCRIPTION OF THE DRAWINGS

The invention admits of various embodiments. For the further explanation of its basic principle one of them is represented schematically in the drawing and is described below. The drawing shows in.

DESCRIPTION OF THE PREFERRED EMBODIMENTS

Figure 1:
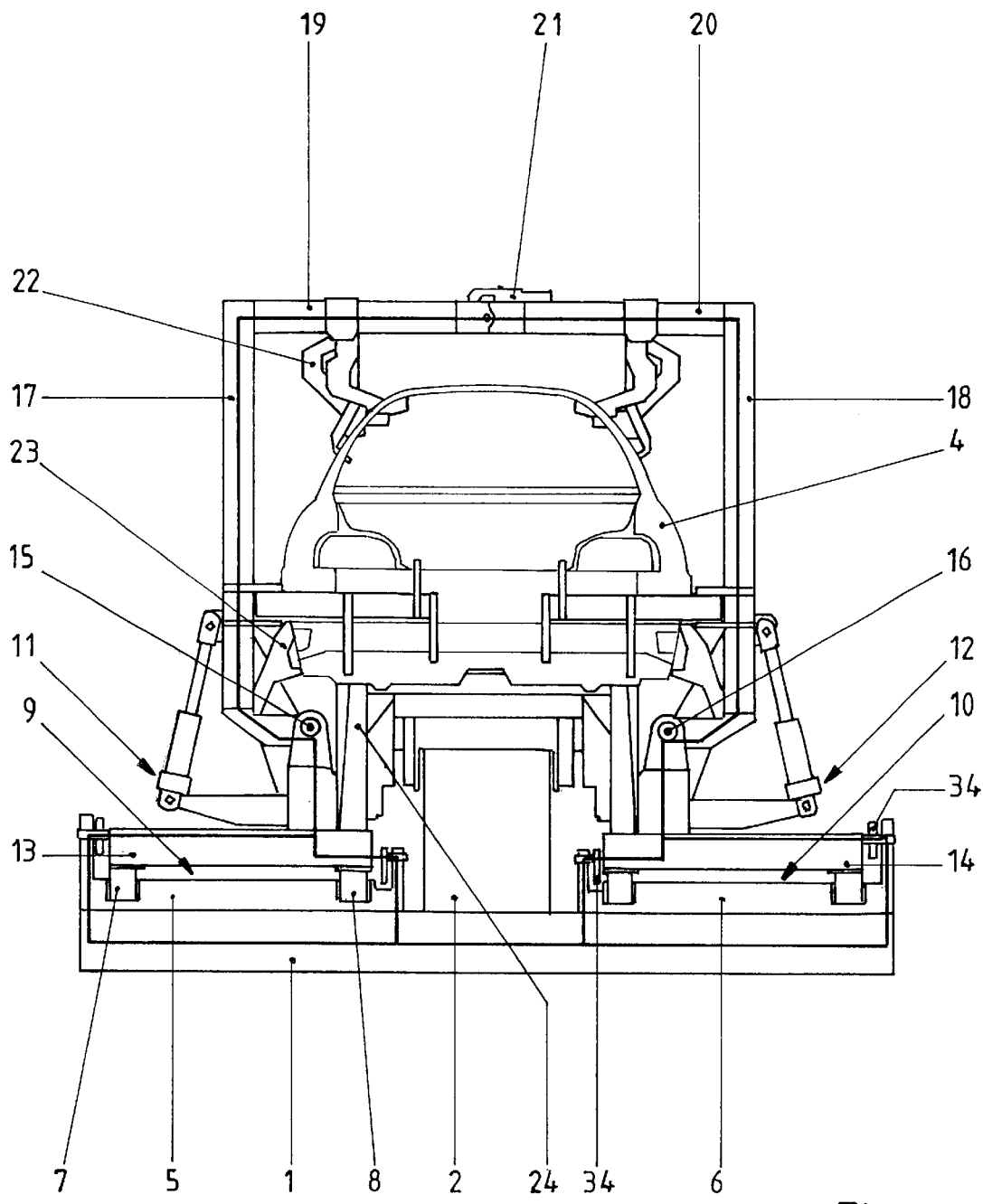
FIG. 1 is a front elevational view of a clamping device according to the invention in the clamping position.
Figure 2:
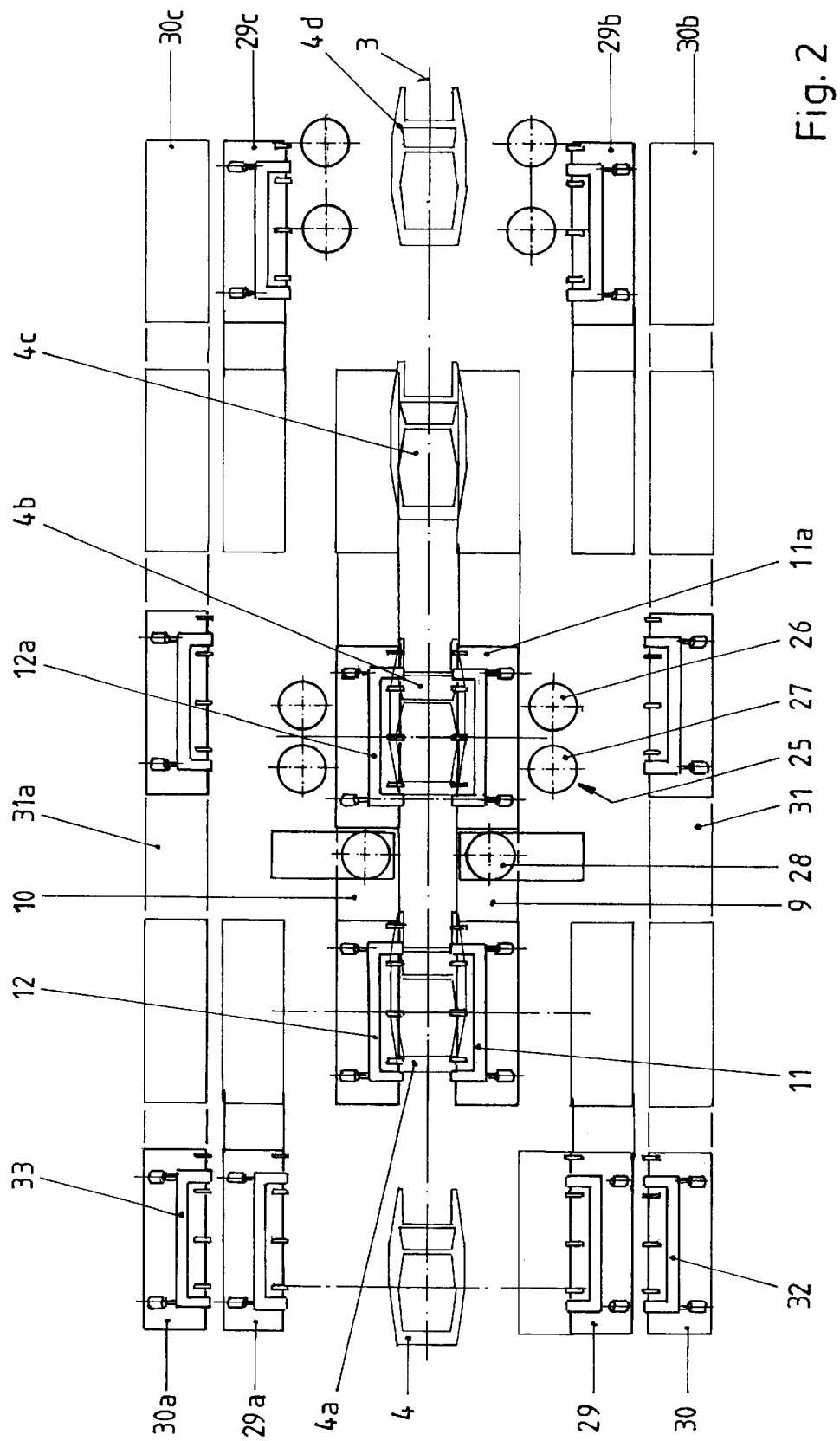
FIG. 2 is a plan view of a portion that is important to the invention, of a production line.

FIG. 1 shows a base frame 1 on which there is disposed a transport apparatus 2 of a production line 3 shown in FIG. 2. This transport apparatus 2 serves for the transport of rough car bodies 4. On the base frame 1 roller supports 5, 6 with rollers 7, 8 are fixedly disposed on both sides of the transport apparatus 2. A plurality of such roller supports 5, 6 positioned one behind the other together form a pathway 9, 10 running parallel to the transport apparatus for side carriages 11, 12. Each side carriage 11, 12 has a supporting frame 13, 14 supported on the rollers 7, 8. Side members 17, 18, each able to turn on a horizontal shaft 15, 16, with crossbeams 19, 20, are fastened on the supporting frames 13, 14. In the working position the two crossbeams 19, 20 are locked together by a latch 21. When the latch 21 is opened, the two side members 17, 18 can swing outwardly about the axes 15, 16 and thereby release the rough car body 4. The side members 17, 18 and crossbeams 19, 20 clamping elements 22, 23 for the rough car body. Clamps designed as bottom clamps 24 are likewise provided on the side carriages 11, 12. Clamping means 34 serve to clamp the supporting frames 13, 14 in the roller supports 5, 6 when the side carriages 11, 12 are in the working position. For this purpose the clamping means 34, when actuated by pressure, thrust against a lateral surface of the supporting frame and against the particular roller supports 5, 6.

In FIG. 2 the rough car bodies 4, 4a, 4b, 4c and 4d are visible in the production line 3. The rough car body 4b is in a welding station 25 which has a total of three welding robots 26, 27, 28 on each side of the production line 3. Also to be seen in FIG. 2, directly beside the production line 3, are two side carriages 11, 12 and 11a, 12a, on each side, by which one rough car body 4a, 4b is supported. The side carriages 11, 12 and 11a and 12a can run on the ways 9, 10, parallel to the production line 3. The welding robot 28 and the opposite welding robot (not numbered) have entered the ways 9 and 10, respectively, in order to assume a position as close as possible to the rough car body 4b.

Laterally offset from the production line 3 and the side carriages 11, 12, 11a, 12a, stations 29, 30, 29a, 30a, 29b, 30b, 29c, 30c for additional side carriages 31, 32 are provided ahead of and behind the welding station 25. The stations 30, 30b and 30a, 30c with the greatest transverse distance from the production line 3 are connected together each by a pathway 31, 31a running behind the robots 26, 27, 28. Thus it is possible to exchange with one another all of the side carriages 32,11, 11a; 33, 12, 12a, on one side, for which purpose the possibility must be created for cross travel between the stations 29, 30, 29a, 30a, 30b, 29b, 29c, 30c.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clamping device for use in production lines for motor vehicles and capable of traveling in a production line direction for transporting rough car bodies traveling in the production line direction on a transport apparatus, comprising:

upstanding side members on both sides of the production line;

crossbeams supported by the side members for clamping the rough car body;

upper clamps supported by the crossbeams, and lower clamps supported by the side members, for clamping the rough car body;

a latch for coupling the crossbeams together in the working position to form a single component;

a common base frame arranged underneath the transport apparatus; and a way disposed on each side of the transport apparatus, each way including a stationary roller support having rollers journaled for rotation in the roller support, the rollers operating to support a supporting frame thereon for movement in the production line direction, the supporting frame being fastened to one of the side members by way of a side carriage, and the supporting frame including clamps for connecting the side carriages to the base frame.

2. A clamping device according to claim 1, wherein each movable supporting frame substantially independently supports a side carriage.

3. A clamping device according to claim 2, wherein the clamps are disposed on both sides of the roller support and are configured for gripping the supporting frame within the roller support.

4. A clamping device according to claim 1, wherein each of the side members with corresponding crossbeam is joined to one of the supporting frames such that each side member is capable of pivoting outwardly away from the production line about an axis running in a direction parallel to the production line and spaced horizontally a set distance therefrom.

5. A clamping device according to claim 1, further comprising a bottom hanger, wherein the side carriages support all of the hangers for the rough car body.

6. A production line comprising at least two clamping devices according to claim 1, arranged one behind the other for at least two different rough car bodies, further comprising at least one station arranged on each side of the production line for an additional side carriage of a pair of side carriages for an additional rough car body variant; and said side carriages on each side of the production line being exchangeable.

7. A production line according to claim 6, further comprising a plurality of stations arranged side by side across the production line, for one side carriage each, ahead of and behind a welding station of the production line, and a transport path leading in back of welding robots of the welding station from the stations in front of the welding station to the stations behind the welding station for the exchange of side carriages on each side of the production line.

8. A production line according to claim 6, wherein a welding robot on each side of the production line is configured for entering into the path of the side carriages along the production line between the roller supports.

9. A hanging system according to claim 1, wherein the stationary roller supports include spaced apart rollers for supporting the supporting frame.

* * * * *

UNITED STATES PATENT AND TRADEMARK OFFICE
CERTIFICATE OF CORRECTION

PATENT NO. : 6,250,533 B1
DATED : March 20, 2001
INVENTOR(S) : Norman H. Margolus It is certified that error appears in the above-identified patent and that said Letters Patent is hereby corrected as shown below:

Title page,
Item [56] References Cited, OTHER PUBLICATIONS, the "Flynn" reference, "c-21" should be -- C-21 --.

Column 19,
Line 11, after "common", delete "15".

Line 12, after "PE", insert -- configuration --.

Column 30,
Line 6, "using" should be -- used --.

Signed and Sealed this

Fourteenth Day of May, 2002

*Attest:*

*Attesting Officer*

JAMES E. ROGAN
*Director of the United States Patent and Trademark Office*